H. B. COOLEY.
MACHINE FOR MAKING PAPER CUPS.
APPLICATION FILED SEPT. 16, 1914.
1,199,160.
Patented Sept. 26, 1916.
7 SHEETS—SHEET 7.
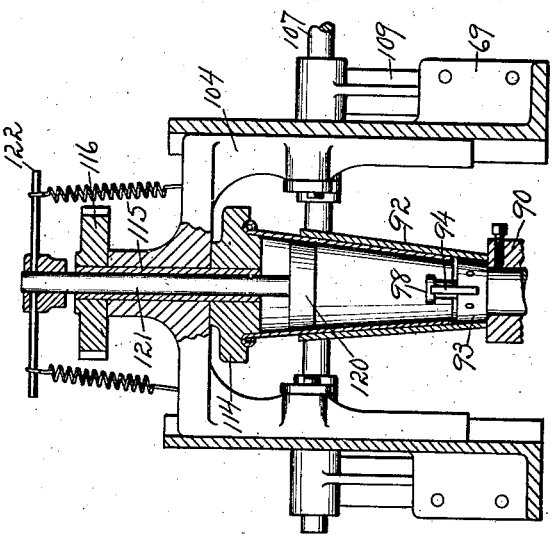
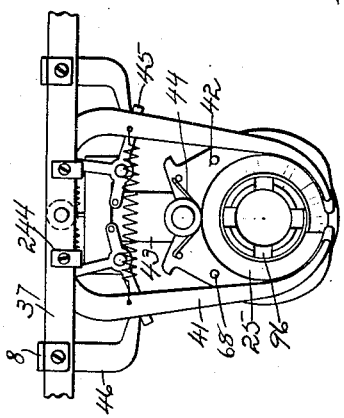
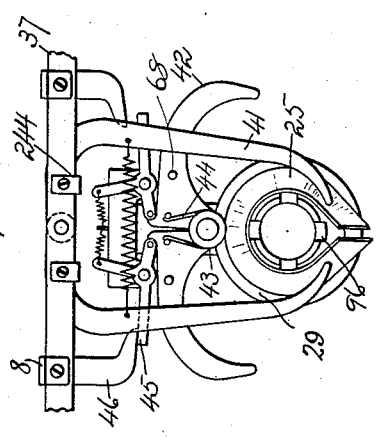
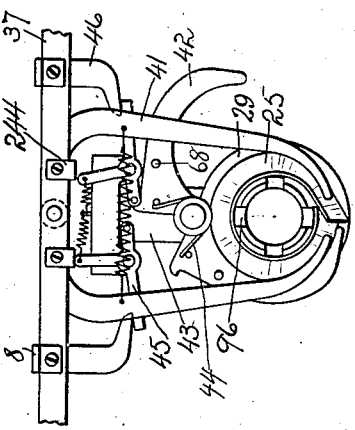
WITNESSES:
INVENTOR.
Henry B. Cooley
BY
Arthur B. Jenkins,
ATTORNEY.

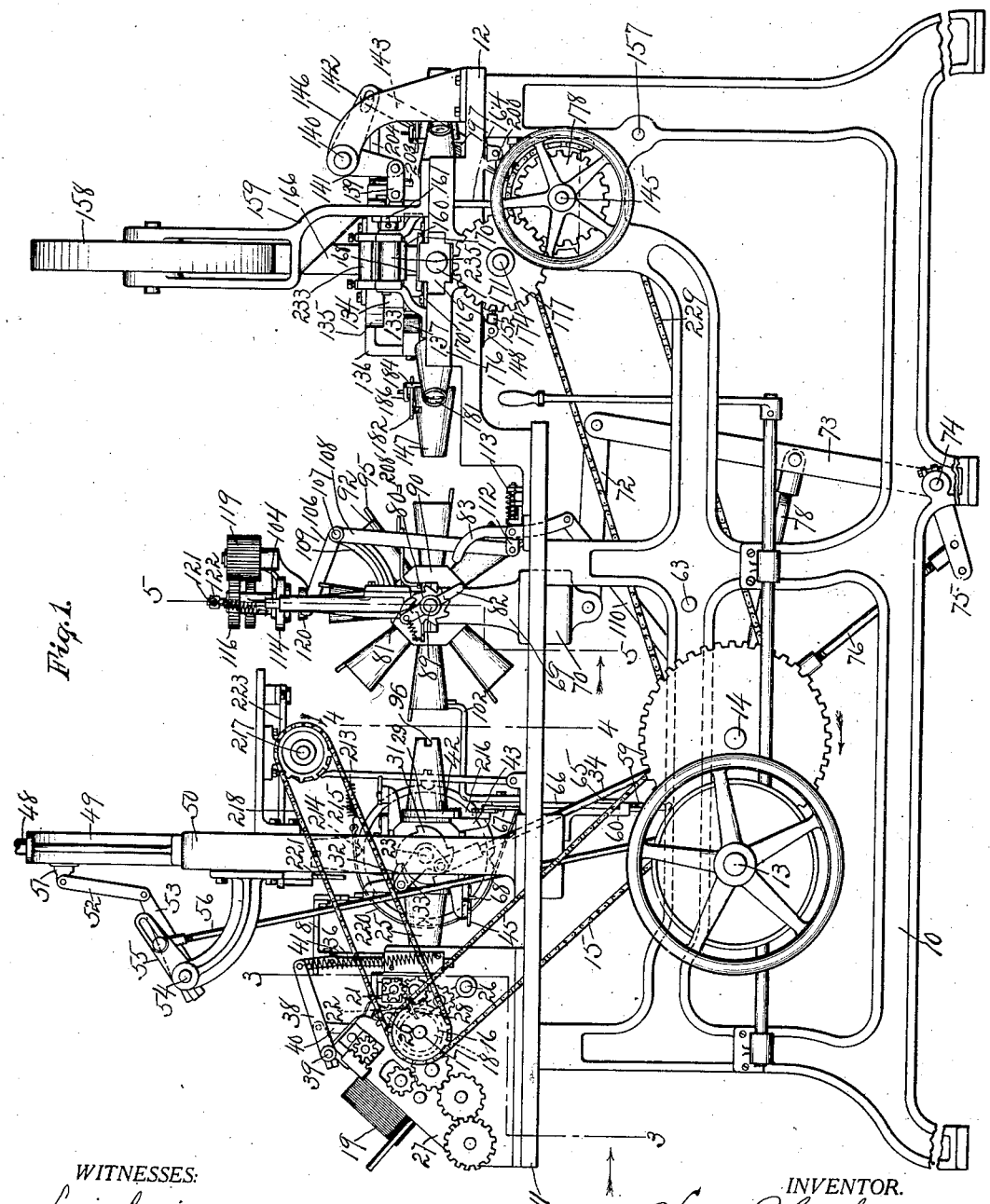

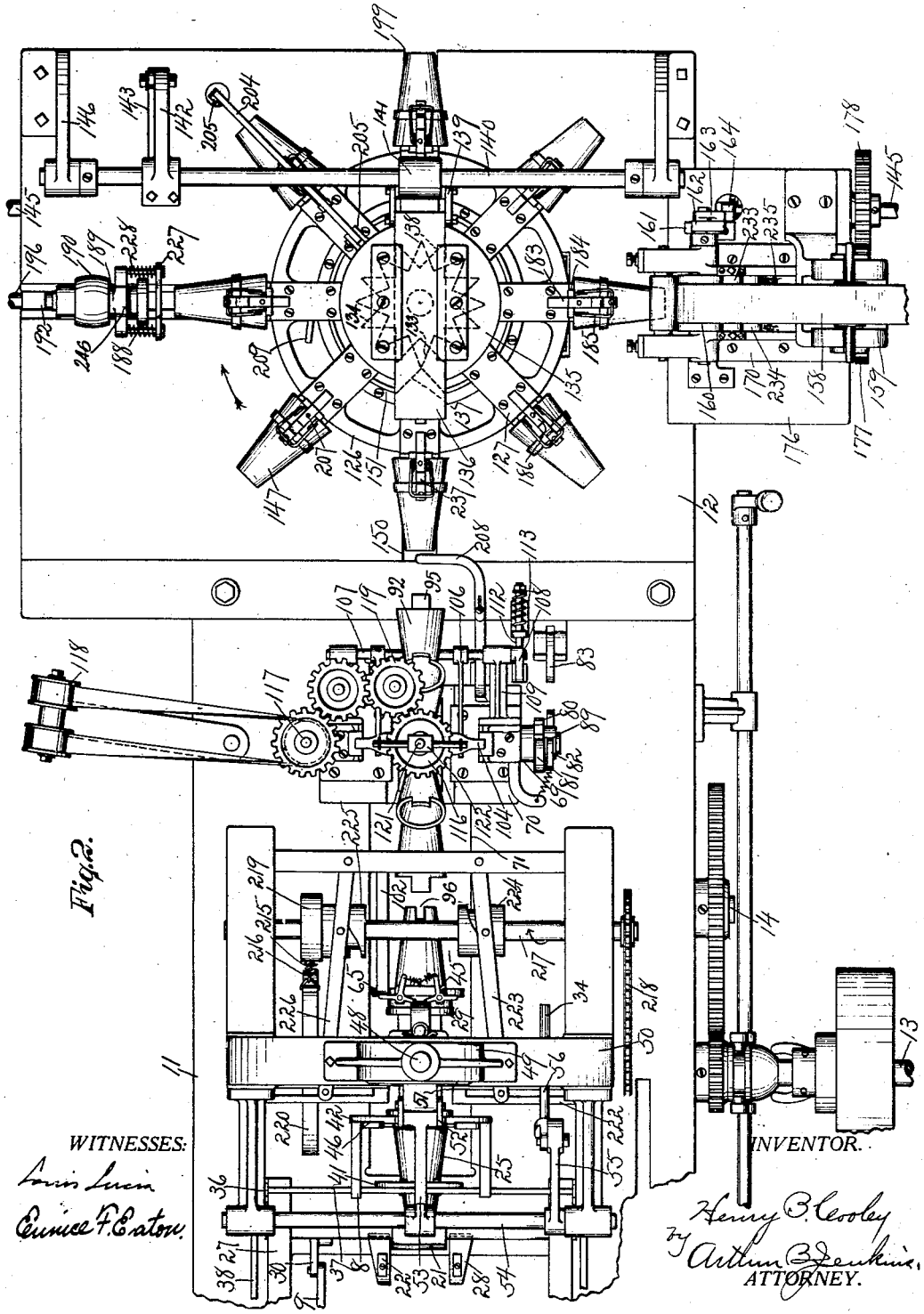

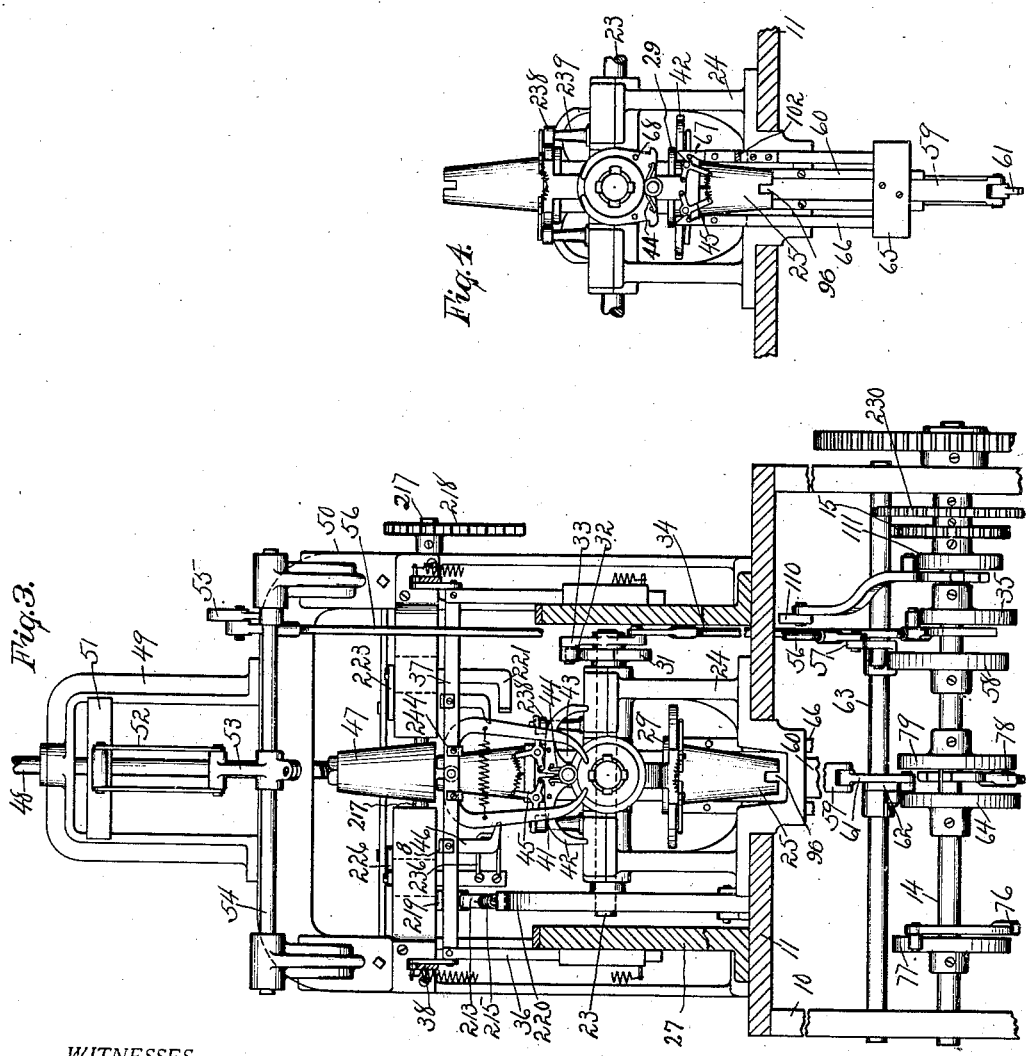

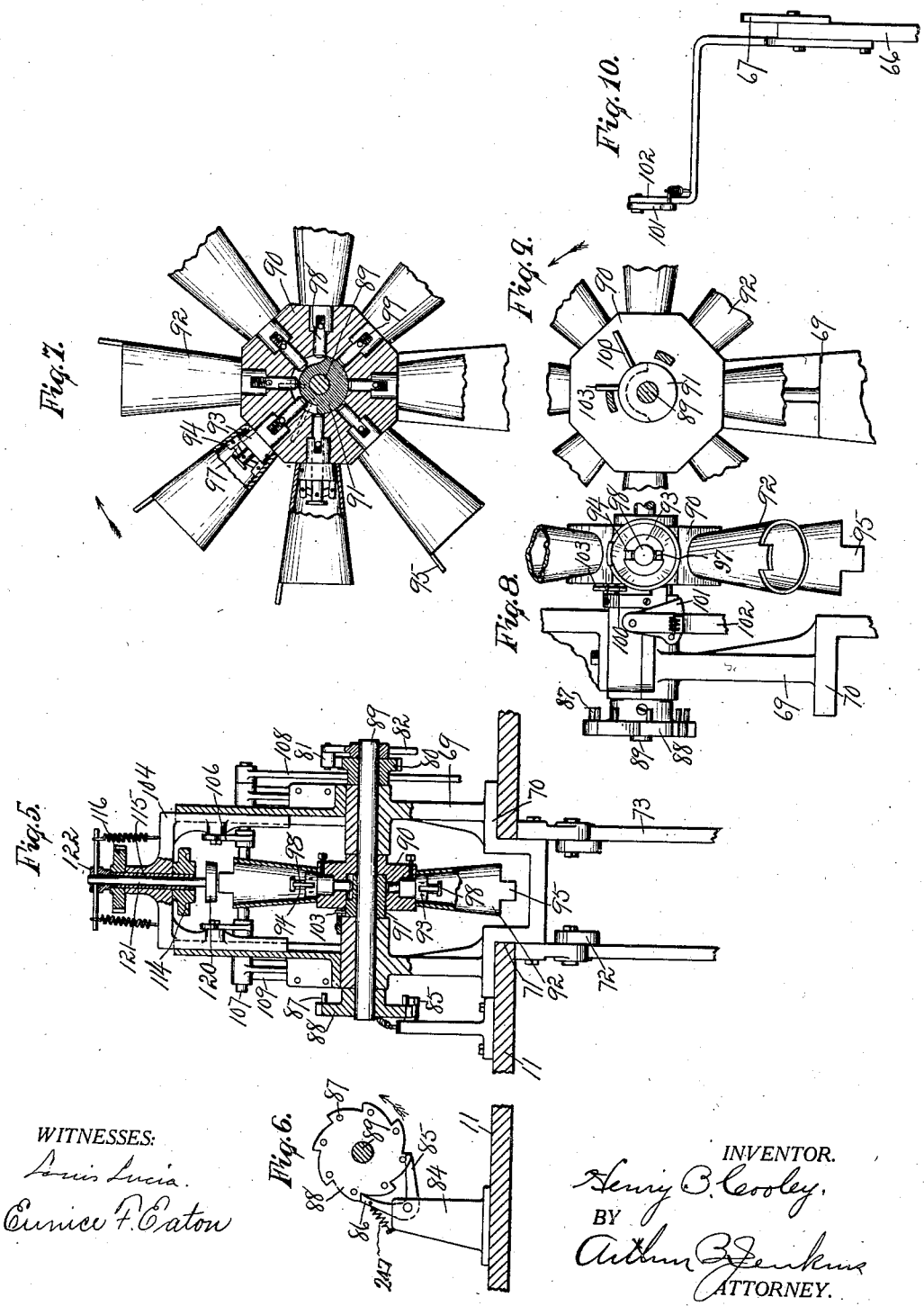

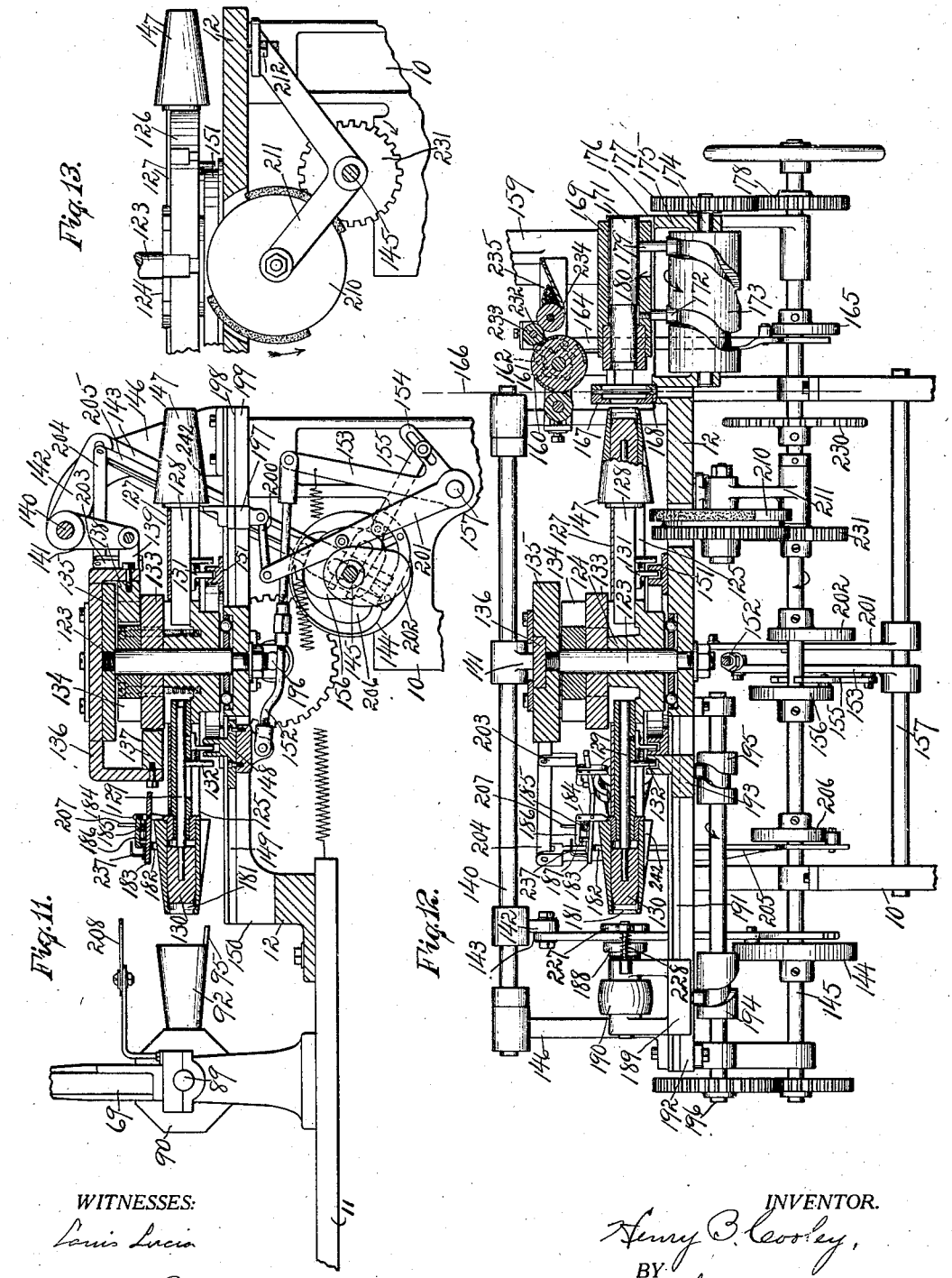

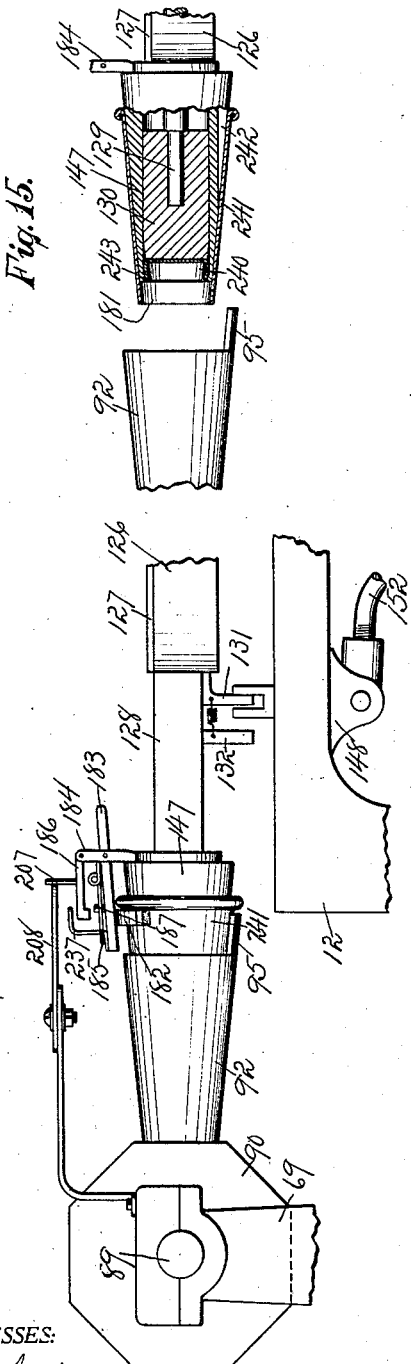
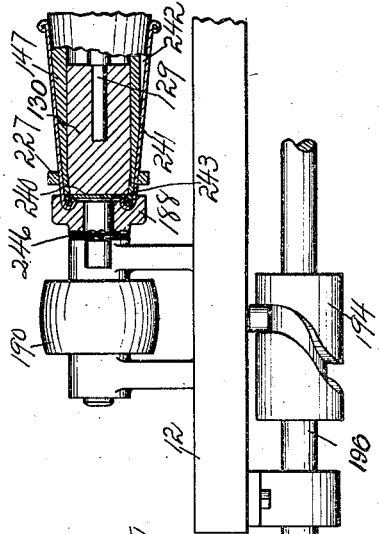
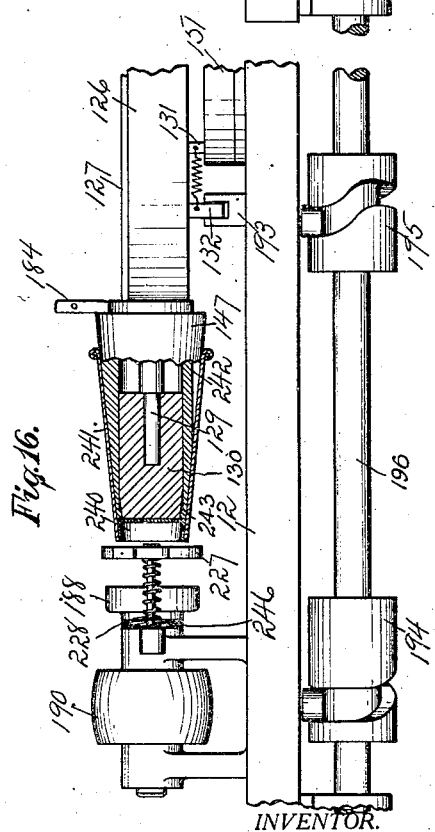

UNITED STATES PATENT OFFICE.

HENRY B. COOLEY, OF KENSINGTON, CONNECTICUT, ASSIGNOR TO THE AMERICAN PAPER GOODS COMPANY, OF MONTCLAIR, NEW JERSEY, A CORPORATION OF NEW JERSEY.

MACHINE FOR MAKING PAPER CUPS.

1,199,160.    Specification of Letters Patent.    Patented Sept. 26, 1916.

Application filed September 16, 1914. Serial No. 862,003.

*To all whom it may concern:*

Be it known that I, HENRY B. COOLEY, a citizen of the United States, residing at Kensington, in the county of Hartford and State of Connecticut, have invented a new and Improved Machine for Making Paper Cups, of which the following is a specification.

My invention relates to machines for making cups of thin material, as paper, and which are commonly known as sanitary drinking cups, and an object of my invention, among others, is to provide a machine of this class that shall produce cups in a particularly efficient manner.

One form of machine embodying my invention and in the construction and use of which the objects herein set out, as well as others, may be attained, is illustrated in the accompanying drawings, in which—

Figure 1 is a view in side elevation of a machine embodying my invention, some of the duplicate parts of the mechanism being omitted for sake of clearness. Fig. 2 is a top plan view of the greater part of the machine, part of the feed mechanism being omitted. Fig. 3 is a view in section through the machine on plane denoted by dotted line 3—3 of Fig. 1. Fig. 4 is a similar view on plane denoted by dotted line 4—4 of Fig. 1 looking toward the forming mandrels, the supporting frame being omitted. Fig. 5 is a view in section through the machine on plane denoted by dotted line 5—5 of Fig. 1. Fig. 6 is a detail view illustrating the mechanism for regulating the rotary movement of the reversing turret. Fig. 7 is a detail view, scale enlarged, illustrating the construction of the cup clamps within the mandrels of the reversing turret. Fig. 8 is a detail view, scale enlarged, illustrating the mechanism for operating the cup clamps of the reversing turret. Fig. 9 is another detail view, scale enlarged, illustrating the cup clamp operating mechanism of the reversing turret. Fig. 10 is another view, scale enlarged, illustrating this cup clamp operating mechanism. Fig. 11 is a view in vertical section through the machine on plane passing through the axis of the finishing turret lengthwise of the machine, some of the cup clamps being omitted. Fig. 12 is a like view, but on plane crosswise of the machine. Fig. 13 is a detail view illustrating auxiliary supporting and rotating mechanism for the finishing turret, some of the mandrels and cover plates being removed. Fig. 14 is a detail view, scale enlarged, illustrating the operation of the finishing turret mandrels in removing cups from the mandrels on the reversing turret. Fig. 15 is a detail view, scale enlarged, illustrating the position of the cups and the bottoms therefor on the finishing mandrels, just after their withdrawal from the mandrels on the reversing turrret. Fig. 16 is a detail view illustrating the construction and operation of the mechanism for affixing the bottoms to the cups. Fig. 17 is a like view illustrating an advanced step in the operation of affixing the bottoms to the cups. The scale of Figs. 2, 3, 4, 5, and 6 is enlarged over that of Fig. 1. The cup clamping mechanism is removed from Figs. 15, 16 and 17. Fig. 18 is a detail view, scale enlarged, illustrating the construction and operation of the folding mechanism. Fig. 19 is a like view illustrating the relative position of the members in an advanced stage of the folding operation. Fig. 20 is another view similar to Fig. 18 and illustrating the relative position of the members of the folding mechanism at the completion of the folding operation. Fig. 21 is a detail view, scale enlarged, in central vertical section illustrating the construction and operation of the mechanism for spinning the upper edges of the cup bodies.

In the accompanying drawings the numeral 10 indicates the frame of my improved machine that may be constructed of any suitable material, preferably embodying side parts or legs supporting a bed 11, one part 12 of which is raised above the other part. A driving shaft 13 is mounted in the frame with a driving pulley mounted thereon, and this shaft is connected by intermeshing gears with a cam shaft 14. A feed and gumming mechanism is driven from the cam shaft as by a sprocket chain 15 passing around a sprocket wheel 16 on a gumming roll shaft 17 having a gear 18 meshing with various other gears and pinions common to the gumming and feed mechanism that may be of any approved form and construction constituting no part of the present invention and for which reason a detailed description is omitted herein, it being sufficient to state that blanks are taken from a pile 19 on the table upon which they rest and are passed between a feed roll on the shaft 17 and one on the shaft 20, a gumming roll on the shaft 17 being supplied with gum on a narrow circumferential strip from a daubing roll in a well known manner and at such part of the gumming roll as will apply the gum to one edge of the blank. From the gumming roll and feed roll 20 the blanks pass between the members of a pair of feed rolls 21 from which they are delivered to a body forming or folding turret, the latter term being hereinafter used for the sake of brevity. This folding turret is secured to a folding turret shaft 23 rotatably mounted in a folding turret frame 24 secured to and rising from the bed 11, a portion of this frame projecting below the bed through an opening therein. The turret includes a series of mandrels 25 rigidly disposed and of the shape of the cups to be produced on the machine. A feed finger shaft 26 is mounted to rock in the side parts 27 of the feed and gumming mechanism, and feed fingers 28, secured to and projecting from said shaft, extend between the shafts of the feed rolls 21, said rolls being larger than the shafts and comparatively short. These fingers have plates to encounter the back edge of the blanks as they are delivered from the feed rolls on to the mandrels, the plates 22 operating to push the blanks against flanges 29 at the bases of the mandrels. The shaft 26 is rocked by a feed finger arm 30 pivotally connected with a rod 9 that is moved longitudinally by a cam (not shown) on the gumming roll shaft 17, the cam being timed to move the fingers against each blank as it is delivered from the feed rolls 21.

The folding turret is rotated intermittently as by means of a ratchet wheel 31 secured to its shaft 23 and moved by a pawl 32 pivoted on a pawl lever 33 loosely mounted on the shaft 23 and operated by a rod 34 actuated by a folding turret feed cam 35 on the cam shaft 14, these parts being timed in their movements to impart a step by step motion to the turret after the folding of each blank upon the mandrel.

A folding frame, including side bars 36 and a supporting bar 37, is mounted to slide in guideways in the side parts 27, these side bars being connected by links with folding levers 38 secured to a rock shaft 39 mounted in bearings on the side parts 27 and actuated by a folding rod 40 connected with an arm secured to the shaft 39. The end of this rod is forked and straddles the shaft 17 that has a cam operating upon a roll upon said rod to move it lengthwise in a manner that will be readily understood, the cam and lower end of the rod not being shown for this reason.

Folders 41 are pivotally mounted on the supporting bar 37, their folding ends being forced normally toward each other, as by a spring (see Fig. 3), such ends also being spaced apart sufficiently to enable them to pass the mandrels in contact therewith and to nearly fold the blanks about the mandrels, the edges of the blanks, however, not being closed together by these folders. Stops 244 on the bar 37 limit the movement of the folders toward each other.

Holders 42, conforming to the cross sectional shape of the mandrels, are pivoted upon holder supports 43 projecting from the bases of the mandrels. These holders are forced into contact with the mandrels by springs, that, as herein shown, are spiral springs, supported on the pivots of the holders, the end 44 of each spring pressing against a pin or shoulder upon a holder, as shown in Fig. 20 of the drawings. Latch levers 45 are pivotally mounted upon the holder supports in position to engage shoulders upon the holders to retain them in their open position, these latch levers being held, as by means of springs, in position to normally engage the holders, (see Figs. 3, 5, and 18 of the drawings). In the construction herein shown each lever has three arms, one of which engages a holder, another having a spring secured thereto, and the other projecting into the path of movement of trips 46 secured to arms 8 projecting from the supporting bar 37. A trip is provided for each of the holders on a mandrel and they are so arranged that one holder is released before the other so that the edges of the blanks will be overlapped and not abut against each other as the holders force them into contact with the mandrel. The parts for rotating the folding turret, and for reciprocating the folding frame are so formed, arranged and operated that the trips move in one direction to operate the latch levers while the folding turret is at rest, and the idle movement of the trips (in the opposite direction) takes place in time and to the proper extent to disengage the latch levers and trips and place the latter in position to operate upon the latch levers of the next succeeding turret when it shall have been moved to position for this operation. The holders 42 also act as folders, in that they complete the folding operation.

After a blank has been delivered to a folding mandrel and folded thereon, this mandrel is rotated into position to receive a forming cone 47 shaped to fit over the mandrels and closely forming the cups thereon. This forming cone is secured to and depends from one end of a forming cone supporting rod 48 mounted for reciprocating movement in the upper part of a guide frame 49 on top of a supporting frame 50 rising from the bed 11. A guide 51 having bearings on the side parts of the frame 49 is secured to the rod 48 and is connected by links 52 with a forming cone lever 53 secured to a forming cone rock shaft 54 having an arm 55 with a forming cone operating rod 56 adjustably secured thereto (see Fig. 1 of the drawings). The lower end of this rod is connected to one end of a forming cone actuating lever 57, the opposite end of said lever being loosely mounted on a supporting rod 63 secured to the side parts of the frame, and a forming cone cam 58 on the shaft 14 engages said lever to operate it to move the forming cone out of contact with the cups upon the mandrels.

A holder releasing plate 59 is mounted in a guide 60 depending from the bed underneath the mandrels when in their rearmost positions, the lower end of this plate being pivotally connected by a link 61 with a holder releasing lever 62 loosely mounted on the rod 63 and resting, intermediate its ends, for operation by a holder releasing cam 64 on the cam shaft 14. This holder releasing plate includes a cross piece 65 with hook supporting rods 66 rising therefrom and having counter-poised releasing hooks 67 pivotally secured at their upper ends in position to engage releasing pins 68 projecting from the side of the holders 42. As a mandrel comes to rest above the holder releasing mechanism, the members of which are formed and positioned to operate, at this time, said mechanism operates to engage the releasing hooks 67 with the pins upon the holders and then moves to open the holders to an extent to be engaged and held by the latch levers 45 until such time as they are again released by the trips 46, as hereinbefore described. As the folding turret rotates the pins 68 are drawn out from engagement with the hooks 67.

The position of rest of the folding turret is determined by a detent lever 213 pivotally mounted on the bed and having a detent engaging notches 214 in a disk 216 secured to the turret shaft. The detent and notches are beveled so that the proper amount of force applied to rotate the turret will disengage the detent from the notches. The detent is caused to yieldingly engage the notches as by means of a spring 215 secured at one end to the detent lever and at its opposite end to a leather band 220 that passes around the disk 216 and is secured at its end to the bed 11 and operates to prevent excessive rotation of the turret. A cam shaft 217 driven as by means of a sprocket chain 218 from the gum roll shaft 17, bears a folding turret justifying cam 219 that is formed to press the detent lever 213 toward the disk 216, and at this time, and while operations are being performed on blanks on this turret, prevent the detent from disengaging the notches in the disk.

When however the detent engages the notches the band brake 220 is under the least tension, and when the cam 219 does not press upon the detent lever the least resistance to the movement of the turret is exerted and this at the time the pawl and ratchet mechanism hereinbefore described is under operation to rotate the turret. At this time the cam 219 is formed to permit the lever 213 to move to release the detent, thus tightening the band brake that acts to restrain rotative movement of the turret and prevent its "over-running."

A presser 221 is mounted on a slide on a slide bar 222 secured to the supporting frame 50, which slide is actuated by a presser cam lever 223 pivotally mounted on the frame and actuated as by a presser cam 224 on the shaft 217, a tucker cam 225 also secured to this shaft operating through a tucker lever 226, a tucker 236 on a tucker slide in the bar 222, this slide being mounted and operated in a manner similar to the presser slide, and the cam being formed to impart proper movement at the right time to effect the desired operations. This tucker passes between the two folds at the joint and insures the smoothness of the under flap.

A reversing turret is rotatably mounted in reversing turret uprights 69, each formed in two sections and rising from a reversing turret slide 70 supported for reciprocating movement in a slideway 71 in the bed 11. Links 72 connect the slide with a reversing turret slide operating lever 73, as herein shown, this being a two part lever, secured at its lower end to a rock-shaft 74 mounted in the lower side parts of the frame of the machine and having an arm 75 connected by a rod 76 with a reversing turret slide operating cam 77 on the cam shaft 14. Another rod 78, connected with the lever 73 intermediate its ends, is actuated by another reversing turret slide operating cam 79 on the cam shaft 14, the cams 77 and 79 coöperating, one to move the reversing turret in one direction and the other to move it in the opposite direction. This reversing turret is rotated as by means of a ratchet 80 secured to the turret shaft and engaged by a pawl 81 on a pawl supporting lever 82 loosely mounted on the turret shaft. One end of this lever is located to strike a pawl operating lever 83 pivotally secured to and extending through the bed 11, the opposite end of this lever being pivotally connected with a reversing turret pawl operating rod 110 having a lengthwise movement imparted to it by means of a reversing turret pawl operating cam 111 secured to the cam shaft 14.

The parts just described and composing the reversing turret rotating mechanism are arranged, formed and operated, to give to the reversing turret a one step rotating movement just after the slide supporting said turret comes to rest at the backward limit of its sliding movement. The degree of this rotating movement of the reversing turret is governed by a regulating pawl pivotally mounted on a post 84 rising from the bed 11, and having a pawl actuating arm 85 and a ratchet stop arm 86, the former under the influence of a spring 247 to engage pawl actuating pins 87 projecting from the side of a regulating ratchet 88 secured to the reversing turret shaft 89, and the latter to engage the teeth of the ratchet wheel to stop its movement. As the slide 70 is moved backward, that is away from that end of the machine into which the blanks are fed, carrying the reversing turret and the regulating ratchet, a pin 87 on the latter strikes the arm 85, the regulating ratchet having rotating movement as well as bodily movement at this time. Contact of a pin with said arm moves the stop arm 86 into the path of the teeth of the ratchet and the latter is therefore brought to rest with the mandrels on the turret in proper position for the operations to be performed.

The hub 90 of the reversing turret is secured to the turret shaft 89, and a clamping cam on a cam collar 91 is loosely mounted on the shaft and projects into a recess extending from one side of the hub axially thereinto. Reversing mandrels 92 are secured to the hub 90, as by mandrel holders 93 having sloping peripheral surfaces to closely fit the inner sloping walls of the mandrels, the reduced shanks of these holders projecting into radially formed recesses in the hub and being held therein as by set screws (see Fig. 5). These reversing mandrels are of the female type, being formed to receive the cup bodies within them, sticking prongs 95 projecting from the upper edge of each mandrel in position to cover the seam in the cup body and assist in the sticking operation.

A cup clamp within each mandrel consists of clamping jaws 94 pivotally secured to the mandrel holder, and acting through notches 96 in the edges of the forming mandrels 25 to clamp a cup body against the inner wall of the reversing mandrel. A toggle 97 extending into one edge of each jaw connects it with a clamp operating plunger 98 projecting through the holder with its inner edge touching the cam collar 91. Clamp operating springs 99 are located in recesses in the sides of the holders, each spring pressing at one end against a wall of the recess and at its other end against a pin or shoulder on the plunger, the springs thus holding the plungers normally in contact with the clamp operating cams. Each mandrel 25 is shown herein as having four notches.

It is desirable that the cup clamps shall act to clamp the cups within the mandrels when the turret is at rest, in order that the cups shall all occupy the same position on the mandrels and not be disarranged as by a jar in the starting movement of the turret when the clamp is loose. I therefore provide a cam actuating arm 100 secured to the cam sleeve and arranged to be engaged by a cam operating pawl 101 pivotally secured to one end of a pawl support 102 projecting from one of the hook supporting rods 66. Thus as the releasing hooks 67 operate to release the holders 42 on a mandrel in the delivery position on the folding turret, they also at the same time operate the cup clamp on a mandrel in the receiving position of the reversing turret. The friction between the cam collar 91 and shaft 89 and turret hub 90 is sufficient to return the cam collar to its normal position of rest, a stop pin 103 striking a fixed part of the frame (see Fig. 9) determining the position of rest of said collar. The shape of the cam is such as to hold the cup clamps engaged with the cups until after the spinning operation is completed, and it may be released at any time thereafter. In the machine as illustrated and described herein the smaller part of the cam against which the plungers 98 rest is concentric for nearly one-half the distance around the cam, and at this point resumes its larger concentric shape so that at the time one clamp is actuated to clamp a cup the clamp on the diametrically opposite side of the turret is released.

A spinning mechanism consists of a spinning frame 104 mounted for reciprocating sliding movement in the top part of the uprights 69, the side parts of this spinning frame being connected by pins in slots with a spinning frame actuating lever consisting of two arms 106, a rock shaft 107, and an arm 108. The shaft 107 is mounted in supports 109 projecting from the turret uprights 69 and the arm 108 is pivotally connected with a spring seated anchoring member 112 mounted on an anchoring support 113 secured to the bed 11 (see Figs. 1 and 2 of the drawings). This arrangement of the spinning frame actuating lever causes the spinning frame to be lowered at each forward movement of the reversing turret, that is, toward the feeding end of the machine, and to be raised in a reverse movement.

A spinning disk 114, of any ordinary construction, is secured to a sleeve shaft 115, mounted in the spinning frame 104, and having a pinion 116 secured thereto and driven by means of a train of pinions from a shaft 117 mounted in bearings in one of the uprights 69 and driven as by means of a belt passing around idlers to any suitable source of power. A pinion 119 meshing with the pinion 116, constituting one of the above mentioned train of pinions, is sufficiently wide to permit the required movement of the pinion 116 with the spinning frame without disengagement of the pinions. A clamp disk 120 is secured to the lower end of a rod 121 loosely mounted in the sleeve shaft 115, said rod having springs, attached to the spinning frame and to a cross bar secured to the end of the rod, to hold the disk normally in its lowermost position on the spinning frame and as determined by a stop 122 secured to the upper end of the rod (see Fig. 5 of the drawings). When the spinning frame is moved downward by the mechanism hereinbefore described, the clamp disk 120 will be forced tightly into a cup within a mandrel, thus clamping the upper edge of the cup firmly within the mandrel for the spinning operation. The contact of the disk with the cup holds the former from further movement in this direction but the frame continues its movement in order to bring the spinning disk 114 into operation upon the edge of the cup, the springs hereinbefore described yielding for this purpose.

A bottom forming and affixing turret, which for the sake of brevity, will be termed herein as a finishing turret, is rotatably mounted upon a finishing turret post 123 secured to the bed 12 and rising from the center of a round recess in the upper part thereof within which recess anti-friction bearings of any suitable form and construction are mounted and upon which the finishing turret rests and rotates. The body of this finishing turret includes a hub 124 with arms 125 projecting radially therefrom and connected by a rim 126. Radial grooves formed in each of the arms and covered by plates 127 contain carrier sleeves 128, that are preferably square in cross section and that have central longitudinal openings to receive the plungers 129 of bottom placers 130. An actuating lug 131 projects from each of the carrier sleeves and actuating pins 132 from each of the plungers, said lugs projecting through slots in the bottom parts of the rim and arms and extending lengthwise of the arms, and said pins projecting through said slots and also through lengthwise slots in the carrier sleeves (as shown in Fig. 11 of the drawings).

Star wheels 133—134, located one above the other, are secured to the upper part of the turret body, the points upon these wheels being staggered one with respect to the other (as shown in Fig. 2 of the drawings). An actuator supporting plate 135 is secured to the upper end of the finishing turret post 123 and has a groove to receive a finishing turret actuator 136 slidably mounted in said groove and having detents 137—138 to engage the teeth of said star wheels. These detents are pointed to fit into the spaces between the points of the star wheels, said points, however, being rounded so that the points of the detents will touch slightly at one side, and acting upon the sloping surface of a tooth on a wheel will give the wheel a one step movement. Two of these one step movements, in the construction of machine herein shown, are required to bring each of the mandrels from one position of rest to the next succeeding position of rest, these two one step movements being caused by a complete reciprocating movement of the actuator imparted by mechanism consisting of links 139 pivotally connecting the actuator with a lever consisting of a rock shaft 140, an arm 141 pivotally connected with the links and secured to said shaft, and an arm 142 secured to said shaft and pivotally connected with an actuator rod 143, extending into position to be operated by a finishing turret actuator operating cam 144 upon a finishing turret cam shaft 145 mounted in the side parts of the frame. The rock shaft 140 is mounted in supports 146 rising from the bed 12 of the base. It will be noted from this construction that the actuator 136, when moved in one direction by the mechanism described, will cause one of the detents to give the turret a one step movement, and as it is moved in the opposite direction, the other detent will give to the turret another one step movement, thus bringing each of the mandrels on the turret from one position of rest to the next succeeding position of rest.

By employing three turrets arranged in series for producing cups, I am enabled, through the agency of the intermediate or reversing turret, to reverse the cup-bodies end for end relatively to the mandrels thereon, so that their rim ends will face outward when carried upon said mandrels to permit such rim ends to be spun, if desired. This relative reversal of the cup bodies as to the mandrels of the intermediate or reversing turret enables said bodies to be arranged on the mandrels of the finishing turret in the same relative position as on the mandrels of the body forming turret, that is, so that the bottom ends of the cup bodies will extend outward when carried upon the mandrels of the finishing turret to permit the bottoms of the cups to be spun to the best advantage. In the operation of these three turrets, the hollow mandrels of the reversing turret are telescoped over the cup bodies then being carried upon the mandrels of the body forming turret. Then, when the reversing turret retires, the cup bodies as carried by it, have their rim ends outward and their bottom ends inward. In this position the cup bodies are presented to the mandrels of the finishing turret which are positioned within the cup bodies then located upon the insides of the hollow mandrels of the reversing turret so that when the mandrels of the reversing and finishing turrets are separated, the bottom ends of the cup bodies extend outward in convenient position for the bottoming operation.

Finishing mandrels 147 are secured to the carrier sleeves 128, these mandrels being of the general form of the cups being made in the machine and of a size to enter the reversing mandrels 92 to such an extent that the cup bodies will project for some distance beyond the edge of the finishing mandrels. A finishing mandrel actuator 148 is mounted in grooves 149 in the wall at each side of a slot 150 through the bed 12, this actuator rising preferably above the surface of the bed and having an opening into which the lugs 131 are passed. A positioning plate 151 is secured to the upper part of the bed 12 and it has an annular groove in which the lugs 131 travel to hold the mandrels in their proper positions and also to direct the lugs into the opening in the actuator 148. A finishing mandrel actuator connecting rod 152 connects the actuator with a finishing mandrel actuating lever mounted on a supporting rod 157 and extending between the side parts of the frame and having an arm 153 that is pivotally connected to said rod and also having another arm 154 that is preferably adjustably pivotally connected with a finishing mandrel actuating rod 155 engaged with and operated by a finishing mandrel actuating cam 156 on the cam shaft 145. It will be understood that all of these parts, including the cam, are shaped, positioned and timed, to impart longitudinal movement to the finishing mandrels 147 at the proper times to cause them to enter and emerge from the reversing mandrels 92.

A roll 158 of paper tape of a width to produce a disk to form the bottoms of the cups, together with the flanges thereon, is rotatably mounted on a paper roll support 159 secured to and rising from the bed 12. This tape passes between feed rolls, one 160, of which has a ratchet 161 rigidly connected therewith for rotating it to feed the paper to cutting and forming dies. A pawl 162 is pivoted on a bell crank lever 163 loosely mounted on the shaft of the roll and actuated by a paper feed rod 164 extending for operation by a paper feed cam 165 on the finishing turret cam shaft 145.

A strip 166, of paper, is fed between a bottom forming and cutting die 167 and a guide 168 secured to the bed 12, and a cutting plunger 169 is mounted in the bed 12, in ways closed by plates 170 (see Fig. 1 of the drawings), the end of this plunger having a die to fit within the cutter opening in the die 167. A forming plunger 171 is slidably mounted in the cutting plunger, and the latter is reciprocated as by means of an actuating pin 172 extending into a slot in a cutting and forming cam 173 secured to a cutting and forming cam shaft 174 mounted in ears 175 on the under side of a shelf 176 extending from the bed 12, the paper roll support 159 and the plunger 169 in fact being mounted upon this part of the bed 12. The cam shaft 174 is driven by a gear 177 thereon, meshing with a gear 178 on the cam shaft 145 (see Fig. 1 of the drawings). A forming plunger actuating pin 179 projects through a slot 180 in the cutting plunger and into a groove in the cutting and forming cam 173 (see Fig. 12 of the drawings).

The cutting and forming mechanism, including the cams, are so positioned, shaped and operated, that the cutting and forming plungers will move substantially together toward the guide and forming die and in substantially the same relative position as shown in Fig. 12 of the drawings. The plunger 169 passes through the guide and into the cutting die to cut a disk from the strip 166 of paper and pass it into the recess in the die 167. Movement of the cutting plunger now stops and the forming plunger is moved to pass the blanks through the opening in the die 167, thus forming a flange on the disks and passing the disks into the bottom receiving recesses 181 in the finishing mandrels 147, the flanges on the bottoms lying against the side walls of said recesses. At the completion of this operation, the formation of the cam slots in the cam 173 is such as to return the cutting and forming plungers to their former positions and the turret rotating mechanism, as hereinabove described, finally brings a finishing mandrel supplied with a bottom, by a step by step movement, into an intermediate position and then by another step by step movement into position opposite a reversing mandrel on the reversing turret, at which point the finishing mandrels are projected, in the manner hereinbefore described, into cups within the spinning mandrels, the mandrels being so shaped, however, that the bottom edges of the cups project for some distance beyond the outer ends of the finishing mandrels.

Cup holding mechanism is now operated to clamp the cups in place upon each finishing mandrel, this holding mechanism appurtenant to each mandrel consisting of a cup holding clamp 182 secured to the end of a holding clamp lever 183 pivotally mounted in a projection 184 from the finishing mandrel 147. A spring 185 forces each clamp in position to clamp the cup upon the mandrel, and a clamp holder 186 engaging a lug 187 on the clamp lever holds the clamp released from the cup and against tension of said spring. The clamps conform to the shape of the outer surfaces of the mandrels to securely hold the cups in place, and in order to aid in removing the cups from the spinning mandrels the clamps are positioned to rest against and exert a pull upon the beads at the upper edges of the cup bodies, as shown in Fig. 14. Holder stops 237 prevent excessive movement of the holders 186.

As a finishing mandrel is moved forward into a reversing mandrel a clamp releasing finger 207 on a clamp holder 186 is moved against a clamp holder releasing trip 208 projecting from the support for the reversing turret.

As a finishing mandrel is moved from an intermediate position to a position to receive a cup body from a reversing mandrel a guide 209 secured to the bed 12 is located in position to encounter the actuating pins 132 projecting from the plungers 129 and guide them into the opening in a bottom placer actuator slide 193.

A finishing mandrel, by the operation of the turret rotating mechanism, as hereinbefore described, is now given a step by step movement from the point at which it received the cup body, to an intermediate position, and then by another step by step movement into position opposite the bottom securing mechanism, consisting of a bottom spinning disk 188, of any desired form, secured to a shaft mounted in bearings on a bottom spinning slide 189 and driven as by a belt from any suitable source of power passing around a pulley 190 secured to the shaft of the spinning disk. The slide 189 has lateral projections located in grooves 191 in the walls of a slot 192 extending laterally through the bed 12. The bottom placer actuating slide 193 also has lateral projections in the grooves 191, and each of the slides 189 and 193 is actuated respectively by a spinning cam 194 and a bottom placer cam 195 on a cam shaft 196 mounted in bearings underneath the bed 12 and driven as by means of intermeshing gears from the finishing cam shaft 145 (as shown in Fig. 12 of the drawings).

In operation, as a finishing mandrel arrives at the position shown in Fig. 12, the slide 193 is moved by its cam 195 to push the bottom toward the mouth of the recess 181 in the mandrel so that the edge of the flange on the bottom will be flush with the edge of the bottom of the cup body 241, these edges being thus located very near the bottom spinning disk 188, which disk being rotated as hereinbefore described is now moved by the cam 194 against the edges of the bottom and cup body to spin and roll the edges of the cup body and the flange on the bottom 240 together inward, thus securing the two parts firmly together. The bottoms 240 may be frictionally held in the recesses 181 as by a bead 243 on the inner surface of the recess, and past which bead the bottoms may be forced by the bottom placers 130.

In the step by step movements of the turret hereinbefore described, a finishing mandrel is now brought from the position in which it received the cup body into a position diametrically opposite thereto, in which position an ejector 197 having lateral projections located in grooves 198 in a slot 199 in the bed 12, is moved against the edge of the cup and through an ejector slot 242 in the mandrel to push the cup therefrom, this ejector being connected by a rod 200 with an ejector lever 201 pivotally mounted on the rod 157 and in engagement with an ejector cam 202 on the finishing cam shaft 145, these parts being shaped and arranged to eject the cups at the proper time. Before reaching this point for the ejection of the cups, and at the time of rest of the turret with a finishing mandrel in the intermediate position between that of spinning and that of ejection, the cup clamp 182 is released by a cup clamp actuating finger 203 on a cup clamp releasing lever 204 pivotally secured at one end to the actuator supporting plate 135 and at the other end to a cup clamp releasing rod 205 extending for operation by a clamp releasing cam 206 on the finishing cam shaft 145, the finger 203 being pressed against an end of the holding clamp lever 183, raising the opposite clamp bearing end until the lug 187 passes the shoulder on the holder and the clamp falls, engaging the shoulder on the lug and holding the clamp in its raised position.

In order to securely hold the cups upon the finishing mandrels during the operation of spinning and securing the bottoms, a cup clamp 227 is carried by the bottom spinning slide 189, the clamp being supported upon headed pins 228 projecting from the bearings for the shaft of the bottom spinning disk. This clamp is yieldingly held by springs upon the pins, so that when the slide is moved toward the mandrel the clamp will first be brought tightly into engagement with the cups upon the mandrels and then the springs will yield, permitting the spinning disk to move against the bottoms of the cups to perform its work.

The finishing turret cam shaft 145 is driven as by a chain 229 passing from the cam shaft 14 to a sprocket wheel 230 secured to the shaft 145. A disk supporting lever 211 is pivotally mounted upon the shaft 145 and a turret moving disk 210 is rotatably mounted on this lever. The periphery of this disk is provided at intervals with shoes, preferably fiber, that will be moved into contact with the under side of the turret, as it is rotated, as by means of intermeshing gears, one of which 231 is secured to the cam shaft 145. The degree of pressure of the shoes against the turret may be controlled as by an adjusting screw 212 extending through the lever and with its end abutting against the bed 12 (see Fig. 13 of the drawings). The shoes are so located and the gears are so timed that the shoes will make contact with the turret just before a detent engages a tooth on one of the star wheels 133 or 134, the disk thus assisting in starting the movement of the finishing turret.

The bottoms of the cups frequently bear some mark, printed or embossed thereon, and I have provided means whereby this may be done during the formation of the cup. In carrying out this idea marking plates 232 are located in the periphery of the feed roll 160, and these may be supplied with ink from an inking roll 233 rotated in contact with an ink daubing roll 234 receiving its ink from a reservoir 235. It will be understood that these plates and ink rolls are so constructed that the ink will be applied only to the portions of the plates intended to make an impression.

It will be noted that the star or toothed wheels 133 and 134 not only comprise a means for moving the finishing turret, but they also, by reason of the angular space between the teeth, form a justifying means to determine the position of the turret, and this justifying means constitutes a material part of my invention. The movement of the turret is started by contact of a detent 137 or 138 at one side of and near the point of a tooth, and the rotation of the turret is stopped and its position defined by the seating of a detent in the angular part at the bottom of the space between the teeth. I contemplate that other means for moving the turret may be employed in connection with the detent and angular shaped space to justify the position of the turret.

Holder squeeze rolls 238 are mounted on posts 239 projecting from the folding turret frame 24 (as shown in Fig. 4 of the drawings). These rolls are located in the path of movement of the ends of the holders 42, as the folding turret is rotated, and operate to press the holders in close engagement with the blank on the turret. As an aid to the proper working of the bottom spinning disk I interpose a seating spring 246 back of the disk so that it is yieldingly supported, its connection with the shaft being such as to cause it to rotate therewith, but permit it to have a yielding action as it comes in contact with the edges of the cup bodies and bottoms.

I claim—

1. A cup making machine including a mandrel to receive a cup body, means for operating upon said body on said mandrel, a second mandrel formed to receive said body, said mandrels being shaped to telescope one within another, means for telescoping the mandrels one within the other, and means movably mounted for securing the cup body to the second mandrel during the separating movement of the mandrels.

2. A cup forming machine including a movably mounted mandrel arranged to receive mandrels located at opposite sides of the path of movement thereof, means for telescoping all of said mandrels one within another, means for operating upon a cup body upon said mandrels, means for moving each of the mandrels into line with one of the other mandrels, and means for transferring a cup body from one to the other of each of said mandrels.

3. A cup forming machine including a movably mounted mandrel, means for folding a blank into a cup body upon said mandrel, means for moving it into position to receive a second mandrel, a second mandrel arranged to inclose the first mandrel, means for telescoping said mandrels one within the other, means for transferring said body from the first to the second mandrel, means for moving the second mandrel into coöperative relation with a third mandrel, a third mandrel arranged to project into the second mandrel, means for telescoping the mandrels one within another, and means for transferring said body from the second to the third mandrel.

4. A cup making machine including a rotatably mounted turret having a number of mandrels, means for performing an operation upon cup parts supported on said mandrels, a second turret rotatably mounted with respect to the first turret, means for telescoping the mandrels upon one turret within those upon the other, means for transferring cup parts from the mandrel on one turret to those on the other, means for performing an operation upon cup parts on the mandrels on the second turret, and means for determining the rotatable position of each of the turrets.

5. A cup making machine including a rotatably mounted turret having a number of mandrels, means for performing an operation upon cup parts supported upon said mandrels, a second turret rotatably mounted with respect to the first turret, means for telescoping the mandrels upon one turret within those upon the other, means for transferring cup parts from the mandrels on one turret to those on the other, means for performing an operation upon cup parts on the mandrels on the second turret, means for determining the rotatable positions of each of the turrets, and means for removing the cup parts from the second turret.

6. A cup making machine including a rotatably mounted turret having a number of mandrels, means for performing an operation upon cup parts upon said mandrels, a second turret rotatably mounted upon an axis disposed transverse to the axis of the first mentioned turret, means for telescoping the mandrels upon one turret within those upon the other, means for transferring blanks from mandrels on one turret to those on the other, means for performing an operation upon cup parts on the mandrels in the second turret, and means for determining the rotatable positions of each of the turrets.

7. A cup making machine including a rotatably mounted turret having a mandrel thereon, means for performing an operation upon a cup part upon said mandrel, means for determining the rotatable position of said turret, a second turret having a mandrel said mandrels being arranged to fit one within another, means for determining the rotatable positions of the mandrel on the second turret, means for causing the mandrels on the two turrets to telescope one within the other, means for transferring the cup part from the first to the second mandrel, means for moving the second mandrel from said transferring position, and means for performing an operation upon cup parts on the mandrel in the second turret after such movement.

8. A cup making machine including a rotatably mounted turret having a number of mandrels, means for performing an operation upon a cup part on said mandrels, a second turret rotatably mounted and having mandrels, the mandrels upon one of said turrets being arranged to fit within those upon the other, means for transferring said cup part from the first to the second mandrel, means for moving the second mandrel from said transferring position, means for operating upon a cup part supported by the mandrels of the second turret after such movement, and means for determining the rotatable position of each of said turrets.

9. A cup making machine including a rotatably mounted turret having a mandrel, means for operating upon a cup part on said mandrel, a second turret rotatably mounted and having a mandrel, said mandrels being adapted to fit one within the other, a clamp upon one of the mandrels to grasp a cup part and remove it from the other mandrel, means for performing an operation upon a cup part supported by the mandrel on the second turret, and means for determining the rotatable position of each of the mandrels.

10. A cup making machine including a rotatably mounted turret having mandrels to receive cup parts, rotatably mounted turrets supported on opposite sides of the first mentioned turret and having mandrels to engage in like manner mandrels upon the first mentioned turret, means for performing an operation upon cup parts supported by the mandrels of each of the turrets, and means for transferring the cups from one turret to the next succeeding turret.

11. A cup making machine including a rotatably mounted turret having a number of mandrels, rotatably mounted turrets located upon opposite sides of the first mentioned turret and having mandrels adapted to fit within those upon the first mentioned turret, means for performing an operation upon cup parts supported by each of said mandrels, and means for clamping a cup part to the mandrels to transfer said cup part from the mandrels of one turret to those of the next succeeding turret.

12. A rotatably mounted mandrel, means for moving the mandrel, means for operating upon a cup body upon said mandrel, a turret rotatably mounted in coöperative relation with respect to said mandrel, means for rotating the turret, and means for otherwise moving the turret to telescope the first mentioned mandrel and mandrels on the turret one within another.

13. A turret rotatably mounted, means for folding a blank into a cup body upon said turret, means for rotating the turret, a second turret rotatably mounted, means for rotating the second turret, and means for otherwise moving the second turret to telescope the mandrels upon the two turrets, those upon one within those upon another.

14. A cup making machine including a movably mounted support with mandrels projecting therefrom, a reciprocating bar with means for moving it, folders pivotally attached to said bar in position to engage said mandrel, means for forcing the fingers toward each other, means for operating the bar, and means encircling the mandrel to retain a cup body thereon after the folding operation.

15. A cup making machine including a rotatably mounted support with mandrels projecting therefrom, holders movably mounted upon the support to clamp blanks upon the mandrels, means for retaining the holders disengaged from the mandrels, means for moving the holders into engagement with the mandrels, and means for moving the holders to disengage them from the mandrels.

16. A cup making machine including a movably mounted support with mandrels projecting therefrom, holders pivotally mounted with respect to each mandrel, means for forcing the holders into engagement with the mandrels, means for retaining the holders in their open positions, means for releasing said retaining means, and means for opening the holders.

17. A cup making machine including a mandrel, a pair of holders pivotally mounted with respect to the mandrel, means for forcing the holders in one direction, means for holding them in this position, means for releasing said holding means, and means for moving the holders in the opposite direction.

18. A cup making machine including a mandrel, holders to engage the mandrel, and mechanism for operating said holders, said mechanism including means for forcing the holders in one direction, means for moving them in the other direction, means for holding them in one position, and means for releasing said holders, one just preceding the other.

19. A cup making machine including a mandrel, a pair of holders movably supported with respect to said mandrel, means for forcing the holders into engagement with the mandrel, means for releasing said holders, means for retaining the holders in their released position, and holder releasing means including a member positioned to release one of the holders just previous to the release of the other holder.

20. A cup making machine including a mandrel, a pair of holders pivotally supported with respect to the mandrel, means for forcing the holders into engagement with the mandrel, means for moving them from said engagement, means for holding them in their released position, a trip support with means for actuating it, and trips supported on said trip support for releasing each of the holders.

21. A cup making machine including a mandrel, holders pivotally mounted to embrace said mandrel, means for forcing the holders into engagement with the mandrel, latch levers to hold them released from the mandrel, a movable trip support with means for operating it, and trips secured to said support.

22. A cup making machine including a movably mounted support with mandrels projecting therefrom, holders located appurtenant to each mandrel, means for forcing the holders into one position, means for retaining them in this position, a trip mechanism to release said retaining means as the holder is moved into relationship with the trip mechanism, and means to move the holders in the opposite direction with respect to each mandrel as said mandrels are brought successively into relationship with said moving means.

23. A cup making machine including a mandrel, a pair of holders to engage the mandrel, means for forcing the holders into one position with respect to the mandrel, a reciprocating slide with means for actuating it, hooks on the slide to engage the holders to move them into another position with respect to the mandrel, means for retaining the holders in the last mentioned position, and means for releasing the holders.

24. A cup making machine including a mandrel, a pair of holders to engage the mandrel, means for forcing the holders into engagement with the mandrel, a reciprocating slide with means for actuating it, hooks on the slide to engage the holders to release them from engagement with the mandrel, means for retaining the holders in their released position, and means for disengaging said retaining means.

25. A cup making machine including a mandrel, a pair of holders to engage the mandrel, means for forcing the holders into one position with respect to the mandrel, hooks mounted to yieldingly engage said holders and move them to another position, means for retaining the holders in the position in which they are placed by said hooks, and means for disengaging the hooks.

26. A cup making machine including a mandrel, a pair of holders to engage the mandrel, means for forcing the holders into one position with respect to the mandrel, a pair of hooks to move the holders into another position, means for retaining the hooks in this latter position, means for operating the hooks, said mandrel being movable to locate the engaging means for said hooks on the holders in the path of movement of said hooks, said mandrel also being movable to withdraw said engaging means from the hooks, and means for moving the mandrel.

27. A cup making machine including a mandrel, folders supported in operative relation with respect to the mandrel, holders to clamp a blank about the mandrel, means for operating said holders and including trips positioned with respect to said folders, and means for causing relative approaching movement of the mandrel, and the folders and trips.

28. A cup making machine including a rotatably mounted turret with mandrels projecting therefrom, holders positioned with respect to each mandrel to clamp a blank thereon, mechanism for operating the holders, said mechanism including means for retaining the holders in one position, folders operatively positioned with respect to the mandrels, trips operatively positioned with respect to the holder retaining means, and means for causing approaching movement of the mandrels and their holders with respect to the folders and trips.

29. A cup making machine including a movably mounted support with mandrels projecting therefrom, means for folding a pasted blank about said mandrel, a forming cone supported to pass over and inclose said mandrels to press the seam of the folded blank, and means for operating the forming cone to inclose said mandrels and for removing it therefrom.

30. A cup making machine including a movably mounted mandrel, means for wrapping a blank about the mandrel, one edge overlying the other and means for tucking said underlying edge of the blank underneath the overlying edge.

31. A cup making machine including a mandrel, means for folding a blank about the mandrel, one edge overlying the other means for tucking the underlying edge of said blank under the overlying edge, and means for pressing the upper fold against the under fold.

32. A cup making machine including a rotatably mounted turret with mandrels projecting radially therefrom, means for folding a blank about a mandrel in one position, a forming cone arranged to fit over said mandrels, means for pressing the forming cone upon the mandrel in another position and in a radial direction thereof, and means for removing the blank from the mandrel in another position thereof.

33. A cup making machine including a mandrel, means for folding a blank about the mandrel, means for tucking one fold of the blank underneath the other, means for pressing the seam of said folds, a forming cone to inclose said mandrel, and means to move the forming cone to press the blank upon the mandrel after the operation of said tucking and pressing means.

34. A cup making machine including a movably mounted support with a mandrel projecting therefrom, means for forming a cup body upon said mandrel, a bottoming mandrel support with a mandrel projecting therefrom, said supports being located to position the mandrels in axial alinement, and means for removing cup bodies from the forming mandrels and for placing them upon the bottoming mandrels.

35. A cup making machine including a rotatably mounted turret having a mandrel projecting therefrom, means for folding blanks about said mandrel, a bottoming turret, said supports being located to position the mandrels in axial alinement, and means for removing blanks from the forming turret and for placing them upon the bottoming turret.

36. A cup making machine including a movably mounted support with a mandrel projecting therefrom, a bottoming mandrel support with a mandrel projecting therefrom, means for forming a cup body upon the forming mandrel, a transmitting mandrel arranged to inclose the mandrels upon the forming and bottoming supports, and means for operating said mandrels to remove a cup body from the forming mandrel and for placing it upon the bottoming mandrel.

37. A cup making machine including a rotatably mounted forming turret with a mandrel projecting therefrom, means for forming a cup body upon said mandrel, a rotatably mounted transferring turret having a mandrel to inclose that on the forming turret, a rotatably mounted turret having a mandrel to fit within that on the transferring turret, and means for operating said mandrels to transfer a cup from the forming turret to the bottoming turret.

38. A cup making machine including a support with a mandrel projecting therefrom and adapted to receive and hold a cup bottom, a bottom forming mechanism located in operative position with respect to said mandrel, and including means for supplying bottoms to said mandrel, means for supplying cup bodies to said mandrel, and means for spinning the body and bottom edges together to secure the bottom in place.

39. A cup making machine including a movably mounted support with a mandrel projecting therefrom, and adapted to receive and hold a cup bottom, bottom forming mechanism supported in operative relation with respect to said mandrel, means for supplying cup bodies to said mandrel, means for simultaneously spinning the edges of the bottom and body together to secure the bottom in place, and means for moving the support to present the mandrel for each of said operations.

40. A cup making machine including a mandrel formed to receive a cup body and having a recess to receive and hold a cup bottom, and means for simultaneously spinning the edge of the bottom and body together to secure the bottom in place.

41. A cup making machine including a mandrel arranged to receive a cup body and having a recess to receive and hold a cup bottom with a flange projecting therefrom, means within the mandrel for causing the edge of the flange and body to register, and means for simultaneously spinning said edges together to secure the cup bottom in place.

42. A cup making machine including a mandrel secured to a movably mounted support, said mandrel being arranged to receive a cup body on its outer surface and having a recess to receive and hold a cup bottom, bottom forming means arranged to place a flanged bottom within said recess, and means for simultaneously spinning the edges of the bottom and body together to secure the bottom in place.

43. A cup making machine including a mandrel, a bottom placer located therein, means for imparting relative movement to the mandrel and placer to position the bottom with respect to a body upon the mandrel, and means for simultaneously spinning the edges of the bottom and body together to secure the bottom in place.

44. A cup making machine including a mandrel arranged to receive a cup body, a bottom placer located within the mandrel, means for moving the placer to position the bottom with respect to a body on the mandrel, and means for simultaneously spinning the bottom and body together to secure the former in place.

45. A cup making machine including a bottom forming mechanism comprising a forming die having a recess with an opening smaller than said recess and extending from the bottom of said recess to the opposite side of the die, a plunger to pass through said opening to form a flange upon a cup bottom, a mandrel to receive said formed bottom, a turret having mandrels thereon, means for alining the turret mandrels and the mandrel containing the bottom, means for transferring cup bodies from the turret mandrels to the mandrel containing the formed bottom, and means for securing the bottom to a cup body upon the mandrel.

46. A cup making machine including a bottom forming mechanism comprising a forming die having a recess with an opening smaller than said recess and extending from the bottom of said recess to the opposite side of the die, a cutting die, a cutting plunger to cut a disk and to pass it into the forming die, a forming plunger to pass the disk through said opening to form the bottom, a mandrel to receive said formed bottom, a turret having mandrels thereon, means for alining the turret mandrels and the mandrel containing the bottom, means for transferring cup bodies from the turret mandrels to the mandrel containing the formed bottom, and means for attaching the bottom to a cup body supported on said mandrel.

47. A cup making machine including a bottom forming mechanism comprising a forming die having a recess with an opening from said recess through the die to the opposite side thereof, a cutting die supported beside the forming die, a cutting plunger to coöperate with said cutting die, a forming plunger longitudinally movable in the cutting plunger, means for operating said plungers, the operation of the forming plunger passing a blank through said opening to form a flange upon a cup bottom, a mandrel to receive said formed bottom, a turret having mandrels thereon, means for alining the turret mandrels and the mandrel containing the bottom, means for transferring cup bodies from the turret mandrels to the mandrel containing the formed bottom, and means for attaching said bottom to a cup body supported on said mandrel.

48. A cup making machine including a bottom forming die having a recess with an opening smaller than said recess and extending from the recess to the opposite side of the die, a guiding die operatively positioned with respect to the forming die, a cutting plunger with means for operating it, a forming plunger longitudinally movable in the cutting plunger to pass a cup bottom through said opening to form a flange upon the bottom, means for moving the forming plunger toward the dies after the cutting plunger has receded from the dies, a mandrel to receive a cup bottom projected through said opening, a turret having mandrels thereon, means for alining the turret mandrels and the mandrel containing the bottom, means for transferring cup bodies from the turret mandrels to the mandrel containing the formed bottom, and means for attaching the bottom to a cup body supported upon the mandrel.

49. A cup making machine including a bottom forming die and a guiding die, the former having a recess with an opening from said recess to the opposite side of the die, means for supplying a strip of paper between said dies, a cutting mandrel positioned to pass into said dies to cut a blank from said strip of paper, a bottom forming mandrel positioned to pass into said dies to project a piece cut from the strip through the opening in the forming die, a mandrel to receive said formed bottom, a turret having mandrels thereon, means for alining the turret mandrels and the mandrel containing the bottom, means for transferring cup bodies from the turret mandrels to the mandrel containing the formed bottom, and means for securing the bottom to a cup body supported on said mandrel.

50. A cup making machine including a forming die with a recess therein and an opening from said recess to the opposite side of the die, a guiding die operatively positioned with respect to said forming die, means for supplying a strip of paper between said dies, a cutting plunger movably mounted to pass into the forming and cutting dies, a forming plunger longitudinally movable in the cutting plunger and adapted to pass through the opening in the forming die, means for operating said plungers, a mandrel to receive the formed bottom from the forming die, a turret having mandrels thereon, means for alining the turret mandrels and the mandrel containing the bottom, means for transferring cup bodies from the turret mandrels to the mandrel containing the formed bottom, and means for securing the bottom to a cup body supported upon the mandrel.

51. A cup making machine including a mandrel movably mounted on a support, means for moving said mandrel in the direction of its axis on its support, means for placing a formed cup body upon said mandrel, and means for performing an operation upon said cup body.

52. A cup making machine including a mandrel adapted to interiorly receive a cup body, a mandrel movably mounted on a support, with means for positioning it within said mandrel and cup body, means for attaching the cup body to the interior mandrel, and means for perfoming an operation upon a cup upon said interior mandrel.

53. A cup making machine including a mandrel arranged to receive a cup body therein, a mandrel movably mounted on a support, means for positioning said mandrel within the mandrel adapted to contain the cup body for the purpose of receiving said body, means for securing the cup body to the interior mandrel, means for withdrawing the mandrel, and means for operating upon the body upon said mandrel.

54. A cup making machine including a mandrel arranged to receive a cup body therein, a mandrel movably mounted upon a support, means for moving said mandrel into the mandrel adapted to contain the cup body and into the latter, means for securing the cup body to the interior mandrel, a bottom placer within said mandrel, means for operating the bottom placer to position a bottom in a cup body, and means for securing the cup bottom to the body upon the mandrel.

55. A cup making machine including a bottoming mandrel support, a bottoming mandrel mounted on said support and having a recess to contain bottoms, means for supplying bottoms to said recess, a mandrel adapted to contain a cup body and to receive said bottoming mandrel, means for moving the bottoming mandrel into the mandrel adapted to contain the cup bodies, means for removing the bottoming mandrel therefrom, and means for spinning the bottoms and bodies together to secure the bottoms in place.

56. A cup making machine including a bottoming mandrel support, bottoming mandrels on said support having recesses to contain bottoms, means for supplying bottoms to said recesses, a mandrel adapted to contain a cup body and to receive said bottoming mandrels, means for moving the bottoming mandrels into the mandrel adapted to contain the cup body, means for removing the bottoming mandrel, and means for spinning the bottom and body together.

57. A rotatably mounted turret with mandrels projecting therefrom, a toothed member rigidly connected with the turret, a sliding actuator having a detent to first engage the teeth of the toothed member at one side and near the point thereof, and means for moving the actuator to seat the detent at the base of the tooth.

58. A rotatably mounted turret with mandrels projecting therefrom, a toothed member rigidly connected with the turret, an actuator having a detent to first engage the teeth of the toothed member at one side of and near the point, means for moving the actuator, a turret moving disk arranged to intermittently engage the turret to assist its movement, and means for operating the turret moving disk.

59. A rotatably mounted turret with mandrels projecting therefrom, means for intermittently rotating the turret, a turret moving disk arranged to intermittently engage the turret to assist its movement, and means for operating the turret moving disk.

60. A rotatably mounted turret with mandrels projecting therefrom, means for intermittently rotating the turret, a turret moving disk having a periphery to intermittently engage the turret and at the beginning of each rotating movement thereof, and means for operating the turret moving disk.

61. A rotatably mounted turret with mandrels projecting therefrom, means for intermittently rotating the turret, a turret moving disk positioned for engagement of its periphery with the turret, said periphery being cut-away at points to permit disengagement of the turret and disk during periods of rest of the turret, and means for rotating the disk.

62. A rotatably mounted turret with mandrels projecting therefrom, a toothed member rigidly connected with the turret, a support for the turret, a slide mounted on the support to move radially of the turret, means for moving the slide, and a detent on the slide positioned to first engage the teeth of the toothed member at one side and near the point thereof.

63. A rotatably mounted turret with mandrels projecting therefrom, two toothed members rigidly connected with the turret, a slide projecting across the toothed members, a detent on each end of the slide positioned to engage the teeth of the toothed member on opposite sides thereof, and means for moving the slide.

64. A rotatably mounted turret with mandrels projecting therefrom, two toothed members rigidly connected with the turret, a turret support projecting therethrough, a slide mounted on said support and projecting on opposite sides of the turret, detents on the opposite ends of the slide arranged to alternately engage the teeth of the toothed member on opposite sides thereof, and means for actuating the slide.

65. A rotatably mounted turret with mandrels projecting therefrom, a turret support projecting through the turret, toothed members rigidly connected with the turret and resting one against and above the other, a slide projecting across said support and toothed members having detents each located to engage the teeth on one of said toothed members, and means for moving the slide to cause said detents to alternately engage the teeth of the toothed members.

66. A mandrel formed to receive a tubular body, a clamp pivotally mounted on the mandrel to encircle it, means for forcing the clamp to hold a body on the mandrel, and means disconnected from the clamps for retaining them in a disengaged position.

67. A mandrel formed to receive a tubular body, a clamp pivotally mounted on the mandrel, means for forcing the clamp toward the body, and a retaining lever pivotally mounted on the mandrel and having a lug to engage the clamp to retain it in a disengaged position.

68. A movably mounted mandrel formed to receive a tubular body, means for moving the mandrel, a clamp pivotally mounted on the mandrel, means for forcing the clamp toward the mandrel, means for retaining the clamp in a disengaged position, and a member positioned to engage and release said retaining means that is actuated by the movement of the mandrel.

69. A mandrel formed to receive a tubular body, a clamp pivotally mounted on the mandrel, means for forcing the clamp toward the body, a retaining lever mounted on the mandrel to engage the clamp and hold it in a disengaged position, and movably mounted means to engage and release said retaining means.

70. A mandrel formed to receive a tubular body, a clamp movably mounted on the mandrel to clamp a body thereon, means for holding the clamp in engagement with the body, means for forcing the clamp into a disengaged position, and means movable independently of the mandrel for retaining the clamp in its disengaged position.

71. A movably mounted mandrel formed to receive a tubular body, means for moving the mandrel, a clamp movably mounted on the mandrel to engage said body, means for forcing the clamp into engagement with the body, means for holding it in disengaged position, and a fixed trip located in the path of movement of the retaining means to disengage it from the clamp.

72. A movably mounted mandrel formed to receive a tubular body, means for moving the mandrel, a clamp movably mounted on the mandrel to engage said body, means for forcing the clamp into clamped position, means for retaining the clamp in unclamped position, a trip located in the path of movement of the retaining means to disengage it from the clamp, and means located in the path of movement of the clamp to engage and move it to unclamped position.

73. A rotatably mounted turret, a mandrel projecting therefrom, means for intermittently moving the turret, means for supplying blanks to the mandrel, a clamp to hold blanks on the mandrel, a member located in the path of movement of the mandrel to its receiving position to effect movement of the clamp to clamped position, means located to disengage said clamp during a period of rest of the turret, and means for actuating said disengaging means.

74. A mandrel movably mounted on a support, clamping means mounted on the mandrel, means for moving the mandrel, and a member located in the path of movement of the clamping means on the mandrel to effect clamping action by the movement of the mandrel.

75. A mandrel arranged to receive a blank, means for holding the blank for reception by said mandrel, means for placing the receiving means and mandrel in position for transfer of a blank, a clamp to hold a blank on the mandrel, and means for causing action of said clamp, said means including a member positioned to act by means of said transferring movement.

76. A movably mounted support, a mandrel mounted on said support for movement independently thereof, means for supplying a blank to the mandrel, means for moving the mandrel to receive said blank, a clamp supported by the mandrel, means located in the path of movement of the mandrel on its support to effect clamping movement of said clamp, and means located in the path of movement of the mandrel with its support to effect unclamping action of the clamp.

77. A mandrel formed to receive a tubular body and having a recess to receive a bottom, means for frictionally holding the bottom in said recess, and means for removing the bottom therefrom.

78. A mandrel formed to receive a tubular body and having a recess to receive a bottom, a rib located in said recess to frictionally retain a bottom therein, and means for forcing the bottom from said recess.

79. A rotatably mounted turret, means for starting the rotation of the turret, a star wheel rigidly connected with the turret, a detent to engage the space between the teeth of the star wheels to seat the detent and thereby move the turret to its position of rest, and means for operating the detent.

80. A rotatably mounted turret, means for starting the rotation of the turret, a star wheel rigidly connected with the turret, a slide having a detent to engage the space between the teeth of the star wheel to move the turret to its position of rest in the seating movement of the detent, and means for actuating the slide.

81. A rotatably mounted turret, a support projecting through said turret, a star wheel rigidly connected with the turret, a slide projecting across said support and having a detent on its under surface located to engage the space between the teeth of the star wheel to determine the position of rest of the turret, and means for actuating the slide.

82. A rotatably mounted turret, a support projecting through said turret, a slide mounted in said support and projecting across the turret, a toothed wheel rigidly connected with the turret, a detent projecting from the slide to engage said toothed wheel, a rock shaft positioned over the turret and pivotally connected with the slide, and means for operating the rock shaft.

83. A mandrel formed to receive a cup body, a spinning tool operatively positioned with respect to said mandrel, means for closing the space between the mandrel and spinning tool, and a clamp mounted on the spinning tool support to engage a blank upon said mandrel.

84. A mandrel formed to receive a tubular body, a spinning tool operatively positioned with respect to said mandrel, means for moving the spinning tool toward the mandrel, a clamp mounted on the spinning tool support to engage a blank upon the mandrel to clamp said body to the mandrel, and means to permit movement of the spinning tool after engagement of said clamp.

85. A mandrel formed to receive a tubular body, a spinning tool operatively positioned with respect to said mandrel, means for moving the spinning tool toward the mandrel, a clamp mounted on the spinning tool support between the spinning tool and mandrel to clamp said body to the mandrel, said clamp having a movement independently of said support, and means for yieldingly forcing the clamp away from its support.

86. A movably mounted support, a mandrel movably mounted on its support, means for moving the mandrel on its support, said means being located in the path of and to receive a part rigidly connected with the mandrel, and means for guiding said part to cause engagement with the means for moving the mandrel.

87. A movably mounted support, a mandrel mounted on the support, a bottom placer movably mounted in the mandrel, means located in the path of and to receive a part rigidly connected with said bottom placer to actuate it, and means for guiding said part into engagement with said actuator.

88. A movably mounted support, a mandrel movably mounted on said support, a member located within the mandrel and movably mounted with respect thereto, a movably mounted actuator to engage a part rigidly connected with the mandrel to move it on its support, a movably mounted actuator to engage a part rigidly connected with the member in the mandrel to move it, and means for guiding each of said rigidly connected parts into proper engagement with each of their actuators as the mandrel support is moved.

89. A rotatably mounted turret, means for intermittently rotating said turret, a mandrel movably mounted on the turret, an actuator positioned to engage a part rigidly connected with the mandrel and to move it on the turret when the latter is at rest, and means for guiding said rigidly connected part into engagement with said actuator.

90. A rotatably mounted turret, a mandrel supported on the turret, a bottom placer movably mounted in the mandrel, means for intermittently rotating the turret, an actuator positioned to engage a part rigidly connected with said bottom placer and to actuate it when the turret is at rest, and means for guiding said rigidly connected part into proper engagement with its actuator.

91. A rotatably mounted turret, means for intermittently rotating said turret, a number of mandrels movably mounted on said turret, an actuator positioned to receive a part rigidly connected with each mandrel and to move it on its support during a period of rest of the turret, and means for operating said actuator.

92. A rotatably mounted turret, means for intermittently rotating said turret, a number of mandrels supported by the turret, bottom placers located in each mandrel, a bottom placer actuator positioned to receive parts rigidly connected with each bottom placer and to actuate the latter when the turret is at rest, and means for operating said actuator.

93. A rotatably mounted turret with means for actuating it, a number of mandrels movably mounted on the turret, an actuator for said mandrels positioned to receive rigidly connected parts therefrom and to move said mandrels when the turret is at rest, a bottom placer movably mounted in each mandrel, a bottom placer actuator positioned to receive a rigidly connected part from each bottom placer when the turret is at rest, and means for operating each of said actuators.

94. A rotatably mounted turret, means for intermittently rotating the turret, mandrels movably mounted on the turret, an actuator positioned to receive parts rigidly connected with the mandrels and to move the latter at periods of rest of the turret, means for operating the actuator, and a guide ring adapted to receive the rigidly connected parts with each of said mandrels and to conduct said parts into proper engagement with said actuator.

95. A mandrel formed to receive a tubular blank, a spinning tool, means for relatively positioning the spinning tool and mandrel for operation upon said blank, means for relatively positioning the spinning tool and mandrel for removal of the blank, and means for clamping a blank in the mandrel during such positioning movement.

96. A mandrel formed to receive a tubular blank within it, a delivery mandrel formed to receive said blank upon its outer surface, means for positioning said mandrels to locate said delivery mandrel with a blank upon it within the spinning mandrel, means to relatively position said mandrels to locate the delivery mandrel outside of the spinning mandrel, a spinning tool, means for relatively positioning the spinning tool and spinning mandrel for operation upon said blank, means for relatively positioning the spinning tool and spinning mandrel for removal of said blank, and means for clamping a blank in the mandrel during such positioning movement.

97. A spinning mandrel formed to receive a tubular blank within it, a spinning tool, means for relatively positioning the spinning tool and mandrel for operation upon said blank, means for relatively positioning the spinning tool and mandrel for removal of said blank, a mandrel adapted to receive said blank upon its outer surface, and means for relatively positioning the spinning mandrel and receiving mandrel to locate the latter within the spinning mandrel to receive the blank and to remove it therefrom with said blank upon its outer surface.

98. A spinning mandrel formed to receive a tubular blank within it, means for clamping the blank within said mandrel, a spinning tool, means to relatively position the spinning tool and mandrel for operation upon said blank, means for placing the spinning tool and mandrel in relative inoperative position, a receiving mandrel formed to fit within the spinning mandrel, and means to relatively position the spinning mandrel and receiving mandrel to locate the latter within the spinning mandrel to receive the blank and to locate it outside the spinning mandrel with said blank upon its outer surface.

99. A hollow mandrel movably mounted and formed to receive a tubular blank, means for moving the mandrel, a clamp located within said mandrel, and means for imparting relative clamping movement to the clamp and mandrel to clamp a tubular blank within the mandrel.

100. A hollow mandrel movably mounted and formed to receive a tubular blank, means for moving the mandrel, a clamp located within said mandrel, and means for moving the clamp within the mandrel to clamp said tubular blank against the inner walls of said mandrel.

101. A mandrel movably mounted and formed to receive a tubular blank within it and having a tapered inner wall, means for moving the mandrel, a clamp located within said mandrel, and means for moving the clamp to secure said blank against the tapered inner wall of the mandrel.

102. A mandrel movably mounted and formed to receive a tubular blank, an expansible clamp located within the mandrel, and means for expanding the clamp to secure a tubular blank against the inner wall of the mandrel.

103. A hollow mandrel movably mounted, means for moving the mandrel, a clamp located within the mandrel and having clamp jaws, and means for moving said jaws against the inner wall of the mandrel.

104. A hollow mandrel movably mounted, a member located within the mandrel, clamp jaws pivotally secured to said member, and means for pressing said jaws against the inner wall of the mandrel.

105. A mandrel support, a mandrel projecting from the support, a mandrel holder for securing the mandrel to the support, clamp jaws movably mounted on said holder, and means for imparting clamping movement to said jaws.

106. A movably mounted mandrel support, means for moving said support, a mandrel secured to said support, clamp jaws movably mounted within the mandrel, a plunger connected to operate said jaws, and means for operating the plunger.

107. A mandrel support, a mandrel secured to the support, a clamping device located within the mandrel, a cam, a plunger operatively connected with said clamp, and means for imparting relative movement to the plunger and cam for operation of the former.

108. A mandrel support rotatably mounted, means for rotating the support, a mandrel secured to the support, a clamp located within the mandrel, a cam, a plunger operatively connected with said clamp and in engagement with said cam, and means for imparting relative movement to the plunger and cam.

109. A turret shaft, a hub secured to said shaft, mandrels projecting from said hub, the latter having a recess, means for rotating the shaft, a cam projecting into said recess, clamps located within the mandrels, and plungers connected with the clamps and engaging said cam.

110. A movably mounted support, a mandrel secured to the support, a clamp located within the mandrel, a plunger operatively connected with said clamp, a cam in engagement with said plunger, and means for moving the cam to operate the plunger.

111. A mandrel support, means for moving the support, a mandrel projecting from the support, a clamp within the mandrel, a plunger operatively connected with the clamp, a cam arranged to move with said support and also having independent movement thereof, and means for stopping the movement of the cam.

112. A movably mounted support, a mandrel secured to the support, a clamp within the mandrel, a plunger operatively connected with the clamp, a cam in engagement with said plunger, and a movably mounted member positioned to engage the cam to move it to effect operation of the clamp.

113. A movably mounted support, a mandrel secured to the support, a clamp within the mandrel, a plunger operatively connected with the clamp, a cam arranged to move with said support and also to have movement independently thereof, and a movably mounted member connected with said cam to effect movement thereof independently of said support.

114. A movably mounted support, a mandrel projecting from said support, a clamp located within the mandrel, a plunger operatively connected with the clamp, a cam in engagement with said plunger, a pawl support, a pawl mounted on said support, and means for engaging the pawl and cam to operate the latter.

115. A movably mounted support, a mandrel projecting from the support, a clamp within the mandrel, a plunger operatively connected with the clamp, a cam in engagement with said plunger and arranged to move with said support and also having movement independently of the support, a pawl support, a pawl on said support, means for operatively connecting the pawl and cam, and means for operating the pawl support to effect movement of the cam.

116. A mandrel support, a mandrel projecting from the support, a clamp within the mandrel, a plunger operatively connected with the clamp, a cam in engagement with said plunger and adapted to move with said support and also having movement independently thereof, means for stopping movement of the cam, a pawl support, a pawl thereon, means for connecting the pawl and cam, and means for moving the pawl support to effect operation of the cam.

117. A mandrel support, a hollow mandrel having a tapered interior wall, a mandrel holder having a tapered outer surface to fit said tapered wall and with a projection located in a recess in the support, means for securing said projection in said recess, a clamp mounted on said holder, and means for operating the clamp.

118. A turret frame, a turret hub rotatably mounted on the frame, mandrels projecting from the hub, a spinning frame movably mounted on said supporting frame, means for advancing the spinning frame toward the mandrels, a spinning tool yieldingly and rotatably mounted in the spinning frame and means for operating the spinning frame to move said tool toward the mandrels.

119. A hollow mandrel formed to receive a tubular body within it and having a sticking prong projecting from its outer edge to engage and press the seam on a cup body, a mandrel formed to fit within the hollow mandrel, and means for coöperatively moving said mandrels to locate one within the other.

120. A cup making machine including a rotatably mounted turret, means for moving the turret, a regulating ratchet wheel rigidly connected with the turret, a regulating pawl arranged to engage said ratchet, and means for seating the teeth of the ratchet against said pawl to complete its movement and to hold it against movement and thereby to determine the position of rest of the turret.

121. A cup making machine including a rotatably mounted turret, a regulating ratchet wheel rigidly connected with said turret, a pawl operatively mounted with respect to the ratchet wheel, an arm rigidly connected with the pawl, means for moving the pawl in one direction, and means for moving said arm to move the pawl in the opposite direction.

122. A cup making machine including a rotatably mounted turret, a ratchet wheel rigidly connected with the turret and having projections, a pawl pivotally mounted with respect to said ratchet wheel, a pawl actuating arm rigidly connected with the pawl in the path of movement of said projections to actuate said pawl, and means for otherwise actuating the pawl.

123. A cup making machine including a rotatably mounted turret, a ratchet wheel rigidly connected with the turret and having projections, a pawl pivotally mounted with respect to said ratchet wheel and having a rigidly connected arm to engage said projections to move said pawl into the path of movement of the teeth on the ratchet wheel, and means for disengaging the pawl from said teeth.

124. A movably mounted support, a mandrel projecting from the support, holders within the mandrel arranged diametrically opposite each other to clamp a blank thereto, means for moving the holders into engagement with the blank, a plunger extending inwardly between said holders and pivotally connected therewith, a member in engagement with said plunger to permit its operation, and means for moving the mandrel to sweep the plunger along the member engaged therewith to cause operation of the plunger.

125. A movably mounted support, a mandrel projecting from the support, holders arranged diametrically opposite each other within the mandrel to clamp a blank thereto, a plunger extending inwardly between said holders, toggles connecting said holders and plunger, and means for operating the plunger.

126. A cup making machine including a mandrel having a recess to receive a cup bottom, means for supplying bottoms to said recess when the mandrel is in one position, means for moving the mandrel to another position, means for placing a cup body upon the mandrel while in the last position, and means for securing the cup body and bottom together.

127. A cup making machine including a mandrel tapered from one end to the other and having a recess in the smaller end, means for supplying a bottom to said recess when the mandrel is in one position, means for moving the mandrel to another position, means for placing a cup body upon said mandrel from the smaller end thereof when it is in its second position, and means for securing the body and bottom together.

128. A cup making machine including a mandrel tapered from one end to the other and having a recess in its smaller end, means for inserting a bottom in said recess when the mandrel is in one position, means for moving the mandrel to another position, a second mandrel adapted to receive a cup body and tapered from one end to the other, means for positioning said mandrel in line with the first mentioned mandrel, means for telescoping said mandrels one within the other and for separating them, means for retaining the cup body upon the first mentioned mandrel, and means for securing the body and bottom together.

129. A cup making machine including a mandrel having a tapering recess to receive a cup body, the larger end opening outward, a second mandrel mounted on a rotating support and tapering from one end to the other, the smaller end being outward and provided with a recess, means for supplying bottoms to said recess when the mandrel is in one position, means for rotating the support to place the mandrel in a second position and in line with the first mentioned mandrel, means for telescoping the mandrels one within the other and for separating them, means for retaining a cup body upon the inclosed mandrel, and means for securing the cup body and bottom together.

130. A cup making machine including a mandrel tapered as to its outer surface and having a recess in its smaller end to receive a cup bottom, means for forming a lip on the upper edge of a cup body, means for placing said body upon said mandrel by passing the lipped edge over the small end of the mandrel and to the larger part thereof, and means for securing the bottom in place.

131. A cup making machine including a mandrel shaped to receive a cup body having a lip at its upper edge, a bottoming mandrel formed to receive said cup body from the first mentioned mandrel, and a clamp on the bottoming mandrel positioned to engage the lip at the edge of the cup body.

132. A cup making machine including a tapered mandrel having a recess in its smaller bottomed end, means for placing a flanged bottom in said recess with the flange projecting outward, means for placing a tapered cup body upon said mandrel by passing it from the smaller end toward the larger part thereof, and means for securing the bottom in place.

133. A cup making machine including a mandrel to interiorly receive a cup body with a lip at its upper edge, a second mandrel to project into the first mandrel and cup body therein, and a clamp upon the second mandrel positioned to engage the body of the cup body and with the edge of the clamp underlying said lip.

134. A cup making machine including a mandrel arranged to receive a cup body said mandrel having a recess at one end and with notches extending through the wall of said recess, a hollow mandrel shaped to receive the first mentioned mandrel and a cup body thereon, and a clamp upon the interior of the second mandrel positioned to act through said slots to clamp a cup body against the interior wall of the hollow mandrel.

135. A cup making machine including a mandrel to receive a cup body, a spinning frame, a spindle secured against lengthwise movement in the frame, a spinning tool secured to said spindle and yieldingly mounted in the frame and positioned to act upon the edge of said cup body, means for advancing the spinning frame toward the mandrel, and means for operating the spinning tool.

136. A cup making machine including a mandrel having a recess to receive and hold a cup bottom and an outer surface to receive a cup body, a spinning tool positioned to operate upon the edge of the cup body to secure the bottom in place, and means for yieldingly seating said spinning tool to permit yielding movement with respect to the edge of the cup body.

137. A cup making machine including a mandrel projecting from a support and having a recess in its outer end, means for supplying bottoms to said recess, means for placing cup bodies upon the mandrel over the outer end thereof, and means for securing the bottoms and bodies together.

138. A cup making machine including a mandrel arranged to receive a cup body and having a recess in its outer end to receive and hold a cup bottom with a flange thereon, means within the mandrel for positioning the cup bottom with the edges of the flange and body in the same plane, and means for simultaneously spinning the edges together to secure the cup bottom in place.

139. A cup making machine including a rotatable support, a mandrel mounted to move in an axial direction on said support to receive a cup body, means for rotating the support, means for moving the mandrel in the direction of its axis on said support, means for supplying a cup body on said mandrel, and means for operating upon said cup body upon said mandrel.

140. In a machine for producing paper cups, a series of turrets including a folding turret, a reversing turret, and a finishing turret.

141. In a machine for producing paper cups, the combination with a folding turret, of a reversing turret, and a finishing turret, the reversing turret being located between the other turrets.

142. In a machine for producing paper cups, the combination with a folding turret, of a reversing turret, and a finishing turret, the reversing turret having right-line movement toward and away from the body forming turret, in addition to step-by-step movement.

143. In a machine for producing paper cups, the combination with a folding turret, of a reversing turret, and a finishing turret, and means for justifying each of the said turrets between their step-by-step movements.

144. In a machine for producing paper cups, the combination with a turret to receive cups for operation thereon, of a reversing turret turning in a plane at a right angle to the plane in which the first mentioned turret turns.

145. In a machine for producing paper cups, the combination with a folding turret, of a reversing turret turning in the same plane as that of the folding turret, and a finishing turret turning in a plane at a right angle to the plane of rotation of the reversing turret.

146. In a machine for producing paper cups, the combination with a folding turret, of a reversing turret, a finishing turret, and means for spinning the rims of the cup bodies while the same are being carried by the reversing turret.

147. In a machine for producing paper cups, the combination with a folding turret provided with folding mandrels, of a reversing turret provided with hollow mandrels, and laterally movable with respect to the folding turret for telescoping its hollow mandrels over the mandrels thereof for pressing the seams of the cup bodies and removing the same from the said folding mandrels.

148. In a machine for producing paper cups, the combination with a turret provided with hollow cup body carrying mandrels, of a finishing turret having a series of radially movable mandrels slidable into the said cup body carrying mandrels preparatory to stripping the cup bodies therefrom.

149. In a machine for producing paper cups, the combination with a folding turret provided with a series of folding mandrels, of folding means coacting with the outer ends of the mandrels and arranged for the mandrels to pass between them for clearance as the turret makes its step-by-step rotary movement.

150. In a machine for producing paper cups, the combination with a folding turret provided with a series of mandrels, of folding means coacting with the said mandrels for folding cup body blanks around the same, cup body holding means for the respective mandrels carried by the turret, and means outside of the turret for successively operating the said holding means.

151. In a machine for producing paper cups, the combination with a folding turret provided with a series of folding mandrels, of two folding jaws coacting with the said mandrels for folding the cup body blanks thereupon and arranged to have the said mandrels pass between them for clearance, cup body holding means for the respective mandrels, and means outside of the turret for releasing the said holding means which are carried thereby.

152. In a machine for producing paper cups, the combination with a turret provided with a series of mandrels, of a turret provided with a series of mandrels and having rotary and linear movement, and a justifying device coacting with the last named turret to hold the same with its mandrels in operative positions.

153. In a machine for producing paper cups, the combination with a folding turret having a series of mandrels, of a reversing turret having a series of cones, and a rim-spinning device coacting with the cones of the reversing turret last mentioned for spinning the rim ends of the cup bodies.

154. In a machine for forming paper cups, the combination with a turret provided with hollow cup body receiving mandrels, of a finishing turret having sliding mandrels the smaller ends of which are recessed, means for inserting flanged cup bottoms into the recessed ends of the said sliding mandrels, means for moving the mandrels of the finishing turret radially to enter them into the said cup body receiving mandrels, and means for gripping the cup bodies after the sliding mandrels have been inserted into them for their removal from the said cup body receiving mandrels.

155. In a machine for forming paper cups, the combination with a folding turret provided with forming mandrels, of a body reversing turret provided with hollow mandrels and laterally movable for telescoping the same over the said folding mandrels, means carried by the said reversing turret for stripping the cup bodies from the said folding mandrels, a bottoming turret having radially movable mandrels adapted to be inserted into the hollow mandrels, of the reversing turret, means carried by the said finishing turret for stripping the cup bodies from the insides of the hollow mandrels of the reversing turret, means for feeding flanged cup bottoms into the radially movable mandrels of the finishing turret, means for positioning the flanged cup bottoms with respect to the cup bodies, and means coacting with the mandrels of the finishing turret for fastening the flanged cup bottoms in the bottom ends of the cup bodies.

156. In a machine for forming paper cups, the combination with a folding turret provided with body forming mandrels, of a reversing turret provided with hollow mandrels adapted to be telescoped over the said body forming mandrels, a finishing turret having hollow mandrels adapted to be introduced into the hollow mandrels of the reversing turret, plungers located in the mandrels of the finishing turret, means for feeding cup-bottoms to the said plungers preparatory to the introduction of the mandrels of the bottoming turret into the hollow mandrels of the reversing turret, and means for fixing the cup bottoms into the bottoms of the cup bodies after the same have been removed from the hollow mandrels of the reversing turret.

157. In a machine for producing paper cups, a folding mandrel, a finishing mandrel, a reversing turret located between said mandrels, and means for operating the turret to deliver a cup body from one mandrel into the same relative position upon the other mandrel.

HENRY B. COOLEY.

Witnesses:
    THOS. W. EMERSON,
    W. A. RICE.